J. F. HOLLOWAY.
CAR TRUCK.
APPLICATION FILED MAY 4, 1920.
1,399,709.
Patented Dec. 6, 1921.
2 SHEETS—SHEET 1.
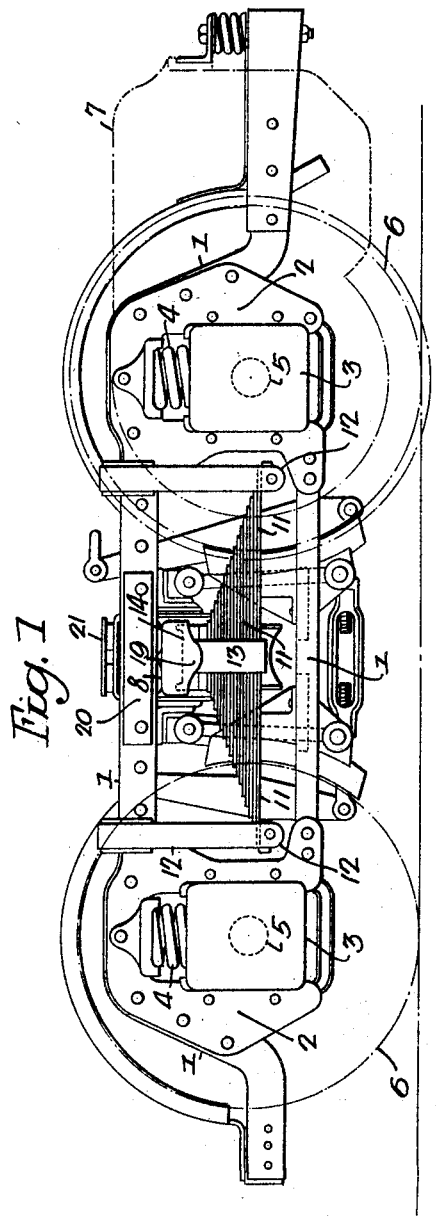
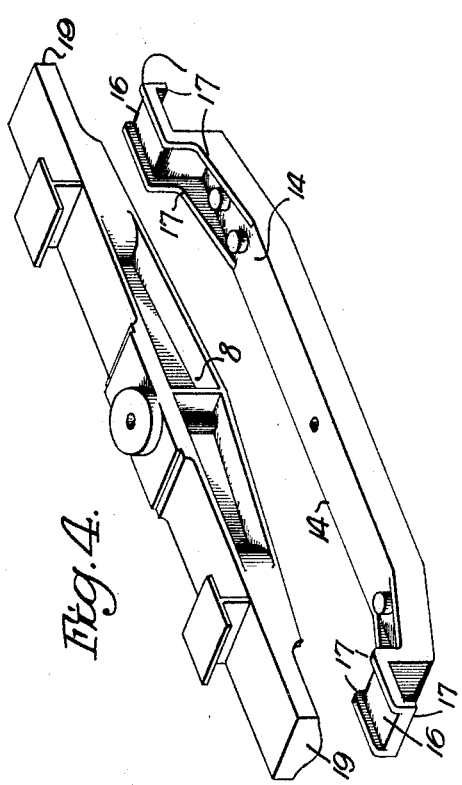
Inventor
Jesse F. Holloway.
by his Attorneys J. F. HOLLOWAY.
CAR TRUCK.
APPLICATION FILED MAY 4, 1920.
1,399,709.
Patented Dec. 6, 1921.
2 SHEETS—SHEET 2.
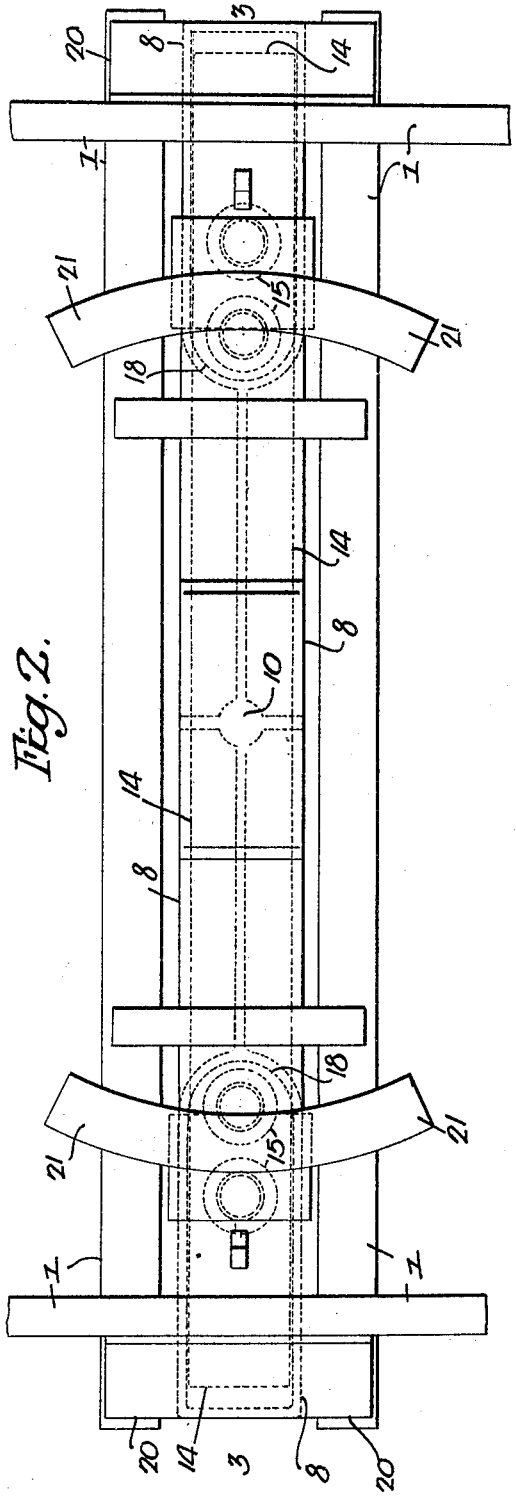
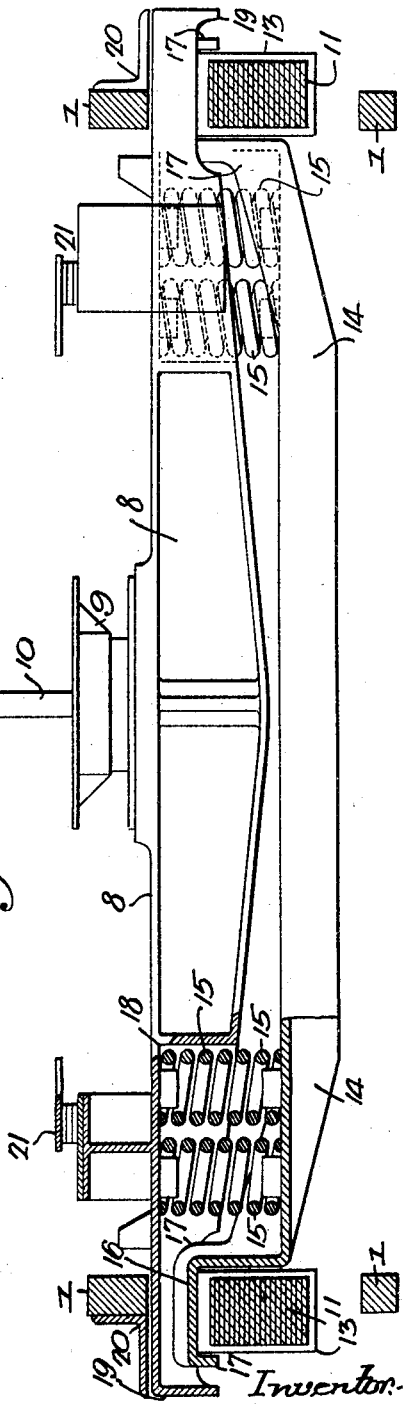
Inventor:
Jesse F. Holloway,
by his Attorneys

UNITED STATES PATENT OFFICE.

JESSE F. HOLLOWAY, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-TRUCK.

1,399,709.   Specification of Letters Patent.   Patented Dec. 6, 1921.

Application filed May 4, 1920. Serial No. 378,801.

*To all whom it may concern:*

Be it known that I, JESSE F. HOLLOWAY, a citizen of the United States, residing in Philadelphia, Pennsylvania, have invented certain Improvements in Car-Trucks, of which the following is a specification.

The object of this invention is to construct a car truck especially adapted for use as an electric motor truck in which there are two sets of springs, one set of springs being auxiliary to the other set so that comparatively light loads are sustained by light springs, and heavy loads are sustained by the heavier springs when the first mentioned springs have been compressed.

This object I attain in the following manner, reference being had to the accompanying drawings, in which:

Figure 1 is a side view of a car truck illustrating my invention;

Fig. 2 is a plan view of the central portion of the truck;

Fig. 3 is a transverse sectional view on the line 3—3, Fig. 2, and

Fig. 4 is a detached perspective view illustrating the truck bolster and the spring beam.

1 is the frame of the truck having pedestals 2 for the boxes 3. 4 are springs located between the frame and the boxes and mounted in these boxes are the axles 5 of the wheels 6 shown by dotted lines in Fig. 1. 7 is the motor mounted on one of the axles and supported on the frame, as shown by dotted lines in Fig. 1. The construction of the frame may be varied without departing from the essential features of the invention.

8 is a bolster carrying the center plate 9, shown in Fig. 3, and 10 is the center pin. This bolster extends through the side members of the frame 1 and over the leaf springs 11 at each side of the frame. These leaf springs are carried by straps 12 extending over the frame 1 in the ordinary manner and the central band 13 of the spring supports a spring beam 14, which is located under the bolster 8 and is spaced some distance therefrom. Between the bolster 8 and the spring beam are coiled springs 15. There are two of these springs at each side of the truck, as clearly shown in Fig. 3, and they are held in position by lugs on the bolster and on the spring beam. The springs 15 are considerably lighter than the side leaf springs 11 and sustain the bolster and the body of the car under light loads.

It will be noticed that the spring beam is less in width than the truck bolster and the portion 16 of the beam is considerably above the main portion of the beam and extends over the leaf springs 11. Each portion 16 of the spring beam has a lip which holds the beam in position on the two springs by which it is supported. These portions 16 of the beam are reinforced by ribs 17 at each side which are extended diagonally at the bottom of the beam, as illustrated in Fig. 4, the body of the beam being in the form of a channel to give it the necessary strength. The bolster 8 is recessed at 18 to accommodate the coiled springs 15 and the end of the bolster is turned down, as at 19, so as to inclose the spring beam. An angle plate 20 is secured to each side of the frame to protect the extended portion of the bolster. 21 are the side bearing plates, which are carried by the bolster in the present instance, and form a part of it.

It will be seen by the above construction that the truck is so designed that light loads are sustained by comparatively light springs 15, which are located between the truck bolster and the spring beam, which is carried by the main heavy springs of the truck, and that when the load increases the springs 15 are compressed and part of the load is carried by both springs, but when the bolster is in contact with the spring beam under excessive loads the weight is taken entirely by the heavy side leaf springs 11.

I claim:

1. The combination in a car truck, of side frames; two leaf springs suspended from the side members of the frame; a spring beam having portions extending over said springs, the center portion of the beam being depressed; a bolster located above the spring beam and extending beyond the side frames and over the leaf springs, said bolster being recessed at each end; coiled springs located in the recessed portion of the bolster and carried by the depressed portion of the spring beam, the distance between the bolster and the spring beam being such that the coiled springs will sustain a light load and when the springs are compressed the bolster will bear on the spring beam directly above the leaf springs and the entire load will be carried by the side leaf springs.

2. The combination in a car truck, of leaf springs suspended from each side of the frame; a spring beam extending over the center of the springs and carried thereby, the central portion of the beam being depressed; flanges on each side of the end portions of the beam; a bolster located above the spring beam and of greater length than the spring beam and having its edges turned down to inclose the said beam, said bolster being recessed near each end; and coiled springs in the recessed portion of the bolster and supported by the spring beam so that the coiled spring will carry light loads and the leaf springs will sustain the heavy loads.

JESSE F. HOLLOWAY.